Patented Jan. 17, 1933

1,894,539

UNITED STATES PATENT OFFICE

HANS MIRAU, OF RADEBEUL, GERMANY, ASSIGNOR TO CHEMISCHE FABRIK VON HEYDEN, A. G., OF RADEBEUL NEAR DRESDEN, GERMANY, A CORPORATION OF GERMANY

COMPOSITION FOR DISINFECTING AND BLEACHING AND METHOD OF MAKING THE SAME

No Drawing. Application filed May 18, 1931, Serial No. 538,249, and in Germany June 23, 1930.

This invention relates to disinfecting and bleaching compositions and it particularly relates to such compositions containing aromatic sulfodichloramides, the object of the invention being to provide means by which the disinfecting and bleaching action is accomplished quickly and effectively without, however, causing a harmful action of the articles to be treated, particularly tissue, regardless whether it be the tissue of a live organic body or whether it be the tissue of a fiber of whatever origin.

In the co-pending U. S. application, Serial No. 315,107, filed October 25, 1928, Richard Feibelmann has described a certain mixture of dichlor-amides of aromatic sulfonic acids with a salt of alkaline reaction, such as dry sodium carbonate, sodium triphosphate, borax, or the like alkali metal salts, said mixture exerting a bleaching effect.

The reaction taking place when the mixture of above mentioned patent application comes into contact with water, may be illustrated by the following equations, in which R stands for any alkyl-rest, for instance $C_6H_4.CH_3-$, to wit:

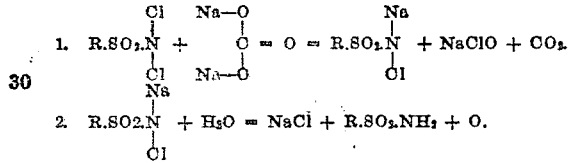

It is seen from Equation 1 that the reaction between the substances leads to a splitting off of carbon dioxide gas; inasmuch as the dissolving of the sodium carbonate takes some time and the sulfodichloramide is not soluble in water, it takes altogether somewhat more time to bring about a complete reaction between the substances than is desirable, especially if a speedy application of the solution is essential.

Another shortcoming of the mixture of the above mentioned application was its bulky form; it did not lend itself to compressing into tablets, or any other regular form convenient for use.

This mixture could only be prepared in powder form, of more or less bulk and always each lot of the same had to be specially weighed off.

All these shortcomings are avoided in my new mixture.

Though it might be expected from the chemical standpoint that a substitution of the dry sodium carbonate, or of the sodium triphosphate and the like salts by an alkali metal hydroxide would result in a quicker action of the solution, such a mixture with sodium hydroxide could not be prepared up to now.

Inasmuch as it is essential that the alkaline substance, for instance sodium hydroxide, be intimately mixed with the arylsulfodichloramide, the hygroscopicity of this sodium hydroxide made itself most unpleasantly felt, because it attracted so much water that it could not be handled on account of its corrosiveness and simultaneously the attracted water started to prematurely decompose the sulfodichloramide. This behavior of the sodium hydroxide made therefore the preparation of a mixture of the same not only a most unpleasant, but also a costly affair.

I have found out, however, that I may prepare dry and stable mixtures of aromatic sulfodihalogenamides and alkali metal hydroxides, or earth alkali metal hydroxides, and that these mixtures are stable notwithstanding the hygroscopicity of the alkali metal hydroxides.

When dissolved in water they furnish solutions, which by the reaction

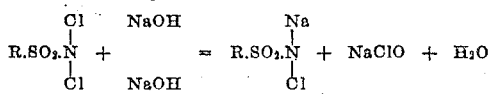

yield aromatic sulfohalogenmono-chloramide sodium and sodium hypochlorite.

The reaction between the substance is practically finished in a few moments as compared with the mixture containing the alkaline salts.

Such mixtures are extremely suitable for disinfection, for bleaching and dyeing. Their action for disinfection depends on the quick action of the sodium hypochlorite, which is a powerful disinfectant, combined with the slow, but effective action of the sulfomonochloramide which represents a kind of after-treatment of the parts to be disinfected.

I am aware that it was known that aromatic sulfodichloramides for instance p-toluenesulfohalogen amide, by being acted upon with an aqueous solution of alkali metal hydroxide, is transformed into the corresponding alkali metal salts of the aromatic sulfomonohalogen amide; but my invention resides not in their reaction, but in the manufacture of dry and stable mixtures of said aromatic sulfodihalogenamides and alkali metal hydroxides. That such mixtures could be made stable was not to be expected in view of the above described great shortcomings caused by the hygroscopicity of the sodium hydroxide; I succeeded, however, in preparing them by admixing inert water soluble salts to the alkali metal hydroxide, the salts being not only inert to both the aromatic sulfodichloramide and the alkali metal hydroxide, but also to the tissue to be treated for disinfection, bleaching etc.

For the better understanding of my new mixtures I am going to illustrate the same by the following examples, in which sodium sulfate is chosen as a representative of the class of inert soluble salts coming in consideration for my invention.

Example I 24 parts dichloramine "T" (p-toluenesulfodichloramide), 10 parts sodium hydroxide and 110 parts sodium sulfate are mixed together and yield 144 parts of a mixture containing 10% active chlorine.

Example II 22.6 parts of dichloramine "B" (benzolsulfodichloramide, 10 parts of sodium hydroxide and 110 parts sodium sulfate are mixed together and yield 142.6 parts of a mixture containing 10% active chlorine.

It is obvious from these above examples that the presence of the inert salt counteracts the hygroscopicity of the alkalimetalhydroxide by secluding it from the moisture of the air. Moreover the plasticity of the alkali metal hydroxide allows to bring the mixture into any desired form by pressing it into tablets, cubes, sticks, etc.

The presence of the inert salt protects the sodium hydroxide, or other alkali metal, or earth alkali metal hydroxide, against the attack by moisture, but also against that of carbon dioxide or other acid vapors in the air, whereby the stable character of the composition might be affected.

Though I speak above chiefly of sulfodichloramide, the invention applies as well to the other aromatic sulfodihalogenamides; likewise I wish to say that when I speak in the appended claims of alkalimetal hydroxides, I mean to include also earth alkali metal hydroxides in the meaning of this term, and therefore within the scope of the respective claim.

Furthermore I wish to say that though I mention the ingredients of the mixture in a certain line, I do not wish to be restricted to such line. Inasmuch as reducing solid sodium hydroxide into the form of a very fine powder, for instance in a grinding or ball mill, is probably one of the nastiest occupations in chemical factory work, I may grind either the sodiumhydroxide first alone and mix it then with the inert salt, such as sodium sulfate, or I grind both the sodiumhydroxide and the sodium sulfate together and admix then the p-toluenesulfodichloramide to the fine powder of the mixture, before I finally bring it into tablet form, which may have any arbitrary or particular size, according to what the composition will be used for.

What I claim is:

1. The method of preparing dry and stable mixtures containing aromatic sulfodihalogen amides for disinfecting, bleaching and the like processes, from aromatic sulfodihalogenamides, said process consisting in adding to an aromatic sulfodihalogen amide a dry alkali metal hydroxide and embodying into the mixture of aforesaid substances a water soluble salt inert to the other ingredients and to the articles to be treated with the solution of the compositions.

2. The method of preparing dry and stable mixtures containing aromatic sulfodichloramides for disinfecting, bleaching and the like processes, said process consisting in adding to the said aromatic sulfodichloramide a dry alkali metal hydroxide and embodying into the mixture of aforesaid substances a water soluble salt inert to both the other ingredients and to the articles to be treated with the solution of the mixture.

3. The method of preparing dry and stable mixtures containing aromatic sulfodichloramides for disinfecting, bleaching and the like processes, said process consisting in adding to the said aromatic sulfodichloramide dry sodium hydroxide and embodying sodium sulfate into the mixture of aforesaid substances.

4. The method of preparing dry and stable mixtures containing p-toluenesulfodichloramide for disinfecting, bleaching and the like processes, said process consisting in adding to the p-toluenesulfodichloramide dry sodium hydroxide and embodying into the mixture of aforesaid substances a dry, water soluble salt inert to the other ingredients.

5. The method of preparing dry and stable mixtures containing p-toluenesulfodichloramide for disinfecting, bleaching and the like processes, said process consisting in adding to the p-toluenesulfodichloramide dry sodium hydroxide and embodying sodium sulfate into the mixture of aforesaid substances.

6. As a new article of manufacture, a dry and stable composition of matter containing an aromatic sulfodihalogenamide, suitable for disinfecting, bleaching and the like purposes, said composition being an intimate mixture of the aromatic sulfodihalogenamide with a dry alkali metal hydroxide and a dry, water soluble salt inert to the other ingredients and to the articles to be treated with the solution of the mixture.

7. As a new article of manufacture, a stable composition of matter containing an aromatic sulfodihalogenamide, suitable for disinfecting, bleaching and the like purposes, said composition being an intimate mixture of the aromatic sulfodihalogenamide with dry sodium hydroxide and a dry, water soluble salt inert to the other aforesaid ingredients.

8. As a new article of manufacture, a dry and stable composition of matter containing an aromatic sulfodihalogenamide, suitable for disinfecting, bleaching and the like purposes, said composition being an intimate mixture of the aromatic sulfodihalogenamide with dry sodium hydroxide and sodium sulfate.

9. As a new article of manufacture, a dry and stable composition of matter containing p-toluenesulfodichloramide, suitable for disinfecting, bleaching and the like purposes, said composition being an intimate mixture of p-toluenesulfodichloramide with a dry alkalimetal hydroxide and a water soluble salt inert to the other aforesaid ingredients and to the articles to be treated with the solution of the mixture.

10. As a new article of manufacture, a dry and stable composition of matter containing sulfodichloramide, suitable for disinfecting, bleaching and the like purposes, said composition being an intimate mixture of p-toluenesulfodichloramide with dry sodium hydroxide and sodium sulfate.

In witness whereof I have hereunto set my hand.

HANS MIRAU.